Patented May 30, 1944

2,350,154

UNITED STATES PATENT OFFICE 2,350,154

NONAQUEOUS DRILLING FLUID

Reginald D. Dawson, Berkeley, and Charles F. Blankenhorn, Oakland, Calif., assignors to Shell Development Company, San Francisco, Calif., a corporation of Delaware No Drawing. Application May 5, 1943,
Serial No. 485,948

11 Claims. (Cl. 252—8.5)

This invention pertains to non-aqueous drilling fluids for use in drilling wells by the rotary method, and relates more particularly to an improved oil-base drilling fluid composition comprising tall oil.

Both aqueous and non-aqueous, or oil-base drilling fluids or mudflushes, are used in rotary drilling. The use of non-aqueous drilling fluids is especially desirable when drilling through a producing formation, as it prevents an invasion thereof by the water from an aqueous drilling fluid, which may cause a permanent or temporary plugging of the formation by said water and result in a decrease of the productivity of the completed well. The use of non-aqueous drilling fluids is also desirable when obtaining cores for purposes of connate water determination. Water from an aqueous drilling fluid contaminates the connate water of the cores, and makes an exact measurement of the percent thereof impossible. The use of non-aqueous drilling fluids is further desirable when drilling through unstable formations, such as heaving shales, which tend to swell and to collapse upon contact with aqueous drilling fluids.

Non-aqueous drilling fluids comprise a liquid or suspending component, and a solid or suspended component.

The suspending component may consist of a suitable non-aqueous liquid such as crude oil, a coal tar or petroleum distillate, fuel oil, Diesel oil, gas oil, stove oil, kerosene, naphtha, alcohols, ketones, chlorinated hydrocarbons, turpentine and the like.

The suspended component may consist of a suitable preferably finely-divided solid material, such as clay, bentonite, fuller's earth or other aluminum silicates, calcium carbonate, limestone, crushed oyster shells, and the like, and/or of ground particles from the formations through which the drilling proceeds. Weighting materials such as barytes, iron or lead oxides, galena, and the like may be added if it is desired to increase the specific gravity of the drilling fluid. If, on the other hand, it is desired to decrease the specific gravity of the drilling fluid, the amount of the solid material suspended therein may be diminished, so that in some cases it is possible to drill with a drilling fluid comprising only the liquid component, for example, crude oil.

Besides the above liquid and/or solid components, oil base drilling fluids successfully used in the field have heretofore inevitably comprised, inter alia, the two following ingredients:

1. A stabilizing agent to prevent the settling or sedimentation of the suspended solid component from the suspended liquid component. For example, lamp black may be used for this purpose according to U. S. Letters Patent No. 2,222,949.

2. A sheath-forming or plastering agent which enables the drilling fluid to form a thin and substantially fluid-impervious sheath on the walls of the bore hole being drilled, whereby any substantial loss of the liquid from the drilling fluid to the formation is prevented. For example, blown asphalt may be used for this purpose according to U. S. Letters Patent No. 2,223,027.

The compounding at the well of a drilling fluid comprising all these elements (liquids and solid components, stabilizing and plastering agents) and the use thereof in drilling presents, however, considerable difficulties.

In order that full benefit may be derived from the sheath-forming properties of the blown asphalt, the asphalt must be completely blended with the liquid component of the drilling fluid, such as Diesel oil, which requires the asphalt to be heated to a relatively high temperature and to be admixed with the oil with thorough agitation. This operation requires conditions and facilities which are usually unavailable at the well head. Drilling fluids comprising lampblack are furthermore strenuously objected to by the drilling crews, since they become ingrained in the skin and clothing of the operators, and cannot be washed off without extreme difficulty.

It has now been found that the compounding of non-aqueous or oil-base drilling fluids can be greatly simplified, and that non-aqueous drilling fluids having stability and plastering properties superior to those of fluids used heretofore can be obtained by adding thereto, or preferably forming therein, relatively small quantities of tall oil soap. It has been also found that tall oil itself is further effective as a viscosity reducer for oil base drilling fluids, and that the viscosity of said fluids can therefore be controlled by varying the amounts of the tall oil added thereto.

Tall oil is obtained by digesting under pressure chips of wood in caustic soda, sulfite liquor or other chemicals, and crystallizing or graining out the tall oil by evaporation of the waste liquor. Tall oil may be refined by processes such as distillation, vapor washing, extraction or decantation, both the refined and the unrefined products being suitable for the purposes of the present invention.

Although it is not desired to advance here any theories for the effectiveness of tall oil in improving the qualities of non-aqueous drilling fluids, it is believed that the reason therefore lies in the particular natural composition thereof, which composition is radically different from that of other substances generally known as vegetable or animal oil, and which thus enables tall oil to impart to drilling fluids excellent properties with regard to stability, plastering effects and viscosity.

As stated above, and as will be seen from the examples given hereinbelow, tall oil may form a part of the present drilling fluids either in its natural (refined or unrefined) form, or may be neutralized with a base to form a soap for this purpose.

When used with a caustic alkali or a base, tall oil may be added to drilling fluids in amounts such as about 10 per cent on the weight of the total fluid. The composition of the drilling fluid may in such cases comprise about 50 to 40 per cent by weight of a petroleum oil such as Diesel, fuel or stove oil, about 40 to 30 per cent of a finely-crushed solid material such as limestone or clay, about 10 per cent of tall oil, and about 10 to 5 per cent of a base, depending on the acid number of the particular tall oil used. Such a mud will then have highly satisfactory properties both with regard to plastering and to sedimentation or settling.

If it is desired to decrease the quantity of the tall oil to about 1 to 4 per cent, it may be desirable to add to the drilling mud a blown or sulfurized asphalt, or other artificial or natural oxidized asphaltic bitumen or material, such for example as gilsonsite, in order to obtain good plastering properties.

Such drilling fluid composition may thus comprise about 40 to 50 per cent of diesel or similar oil, about 46 to 36 per cent of finely crushed limestone or clay, about 10 per cent of blown asphalt, and about 4% of tall oil. A part of the solid material suspended in the oil may be replaced with a heavy material, such as finely-crushed barytes, iron or lead oxide, galena, etc. To facilitate the transportation of the component parts to the well and the compounding of the present drilling fluid, finely crushed solid materials such as limestone, oyster shells, fuller's earth or barium sulfate may be readily coated with tall oil by suspending them in water as a thin slurry, and then adding tall oil with vigorous agitation. After the mixture has been allowed to settle, and the water has been decanted, the particles of the solid material coated with tall oil may be dried in a vacuum oven, giving a material which may be transported to the well site in the form of a packaged powder for ready incorporation in drilling fluids.

When it is desired to use tall oil in neutralized form, any suitable neutralizing agents may be used for that purpose. These neutralizing agents comprise soluble inorganic bases, such as the hydroxides of alkali or alkaline earth metals, for example, sodium hydroxide, potassium hydroxide, calcium hydroxide, etc.; ammonium hydroxide; the soluble salts of these metals with certain weak acids; organic bases and the like; or any mixtures of these substances.

It has been found that it is especially advantageous to form the present muds by effecting a neutralization of the tall oil in situ. Thus, the blown asphalt may be dissolved in the diesel, stove or other suitable oil with heating, and thereafter the necessary quantity of tall oil to give ultimately a 1 to 4 per cent by weight concentration of soap is dissolved in the asphalt solution. Next, the necessary amount of an aqueous base, for example a 20 to 50 per cent solution of caustic potash in hot water, is added at a relatively slow rate and with vigorous agitation. After thorough mixing, the mineral matter, such as clay or pulverized calcium carbonate, or a mixture thereof with barytes, is added to bring up the specific gravity of the fluid to a desired value.

In general, the gel strength of an oil base drilling fluid is a function of its alkalinity. When compounding such a fluid, the viscosity of the mixture may therefore be noted to rise as the basic material is added thereto. If, during the mixing, an excessive amount of the base is added to the fluid, and its viscosity is therefore too high for practical purposes, said viscosity may readily be brought to a desired low value by adding thereto a further relatively small quantity of tall oil, as will be seen from the examples below.

Various ways of compounding the present drilling fluids, and the superior properties thereof will be seen from the following examples:

*Example I*

A drilling fluid was prepared as outlined above with the following composition: 2 per cent of tall oil, 10 per cent of blown asphalt of 10–20 penetration at 77° F. cut back with oil of 33.5° A. P. I. gravity, 46 per cent of stove oil of 38.4° A. P. I. gravity, 40 per cent of crushed oyster shells (85% through 200 mesh) and 2 per cent of a 50 per cent potassium hydroxide solution. The drilling fluid had a density of 74 lbs. per cubic foot (1.19 specific gravity) and a viscosity of 45 centipoises.

After 12 hours standing at 70° C. the drilling fluids had a zero bottom settling and a 6 per cent top settling.

Plastering tests carried out in an apparatus technically known as the Cannon cell gave a fluid loss of 2 cc. in 60 minutes at 90° C. and 500 lbs./sq. in. pressure.

The same mud prepared without tall oil gave bottom settling of 41 per cent after 12 hours standing at 70° C.

The same mud prepared with linseed oil instead of tall oil, and subjected to plastering tests under identical conditions, gave a fluid loss of 3.6 cc.

*Example II*

Two identical drilling fluids were prepared without blown asphalt, each comprising 40 per cent by weight of stove oil, 40 per cent of calcium carbonate and 10 per cent of an aqueous base solution as a neutralizing agent. To the first fluid, 10 per cent of tall oil was admixed, as outlined above, and to the second fluid 10 per cent of soya bean oil.

Neither of the muds showed any settling after standing in an oven at 75° C. for 15 hours.

A Cannon cell plastering test at 90° C. and 500 lbs. per sq. inch pressure gave a through-put of 5.0 cc. for the tall oil fluid and 14.2 cc. for the soya bean oil.

*Example III*

A drilling fluid was prepared by mixing with heating and agitation 10 parts by weight of bentonite, 80 parts of barytes, 50 parts of stove oil, 5 parts of tall oil and 5 parts of a 50 per cent aqueous solution of potassium hydroxide. This fluid had a density of 92 lbs. per cubic foot and showed no settling, but its viscosity was too high. Upon adding, however, a further amount of about 2 parts of tall oil with heating and agitation, its viscosity was reduced to a point below 45 centipoises.

We claim as our invention:

1. A non-aqueous drilling fluid comprising mineral oil, tall oil, and a base admixed thereto, and a finely divided solid material adapted to increase the specific gravity of the fluid suspended therein.

2. A non-aqueous drilling fluid comprising mineral oil, an asphaltic material, tall oil and a base admixed thereto, and a finely divided solid material adapted to increase the specific gravity of the fluid suspended therein.

3. In the art of drilling oil or gas wells, the process comprising introducing into the well a non-aqueous drilling fluid containing tall oil.

4. In the art of drilling oil or gas wells, the process comprising introducing into the well a non-aqueous drilling fluid containing tall oil and a base.

5. In the art of drilling wells by the employment of a non-aqueous drilling fluid, the process comprising adding a small percentage of tall oil to the drilling fluid.

6. A non-aqueous drilling fluid comprising mineral oil, a finely divided solid material adapted to increase the specific gravity of the fluid, and a small quantity of tall oil.

7. A non-aqueous drilling fluid comprising mineral oil, a finely divided solid material adapted to increase the specific gravity of the fluid, and a small quantity of tall oil and of a basic reacting agent adapted to neutralize the tall oil.

8. A non-aqueous drilling fluid comprising mineral oil, a finely divided solid material adapted to increase the specific gravity of the fluid, and a small quantity of tall oil at least partially neutralized with a basic reacting agent.

9. A non-aqueous drilling fluid comprising mineral oil, finely divided calcium carbonate, and a small quantity of tall oil at least partially neutralized with a basic reacting agent.

10. In the art of drilling oil or gas wells, the process comprising circulating in the well a non-aqueous drilling fluid containing tall oil and a basic reacting agent.

11. In the art of drilling oil or gas wells, the process comprising circulating in the well a non-aqueous drilling fluid containing tall oil at least partially neutralized with a basic reacting agent.

REGINALD D. DAWSON.
CHARLES F. BLANKENHORN.